UNITED STATES PATENT OFFICE.

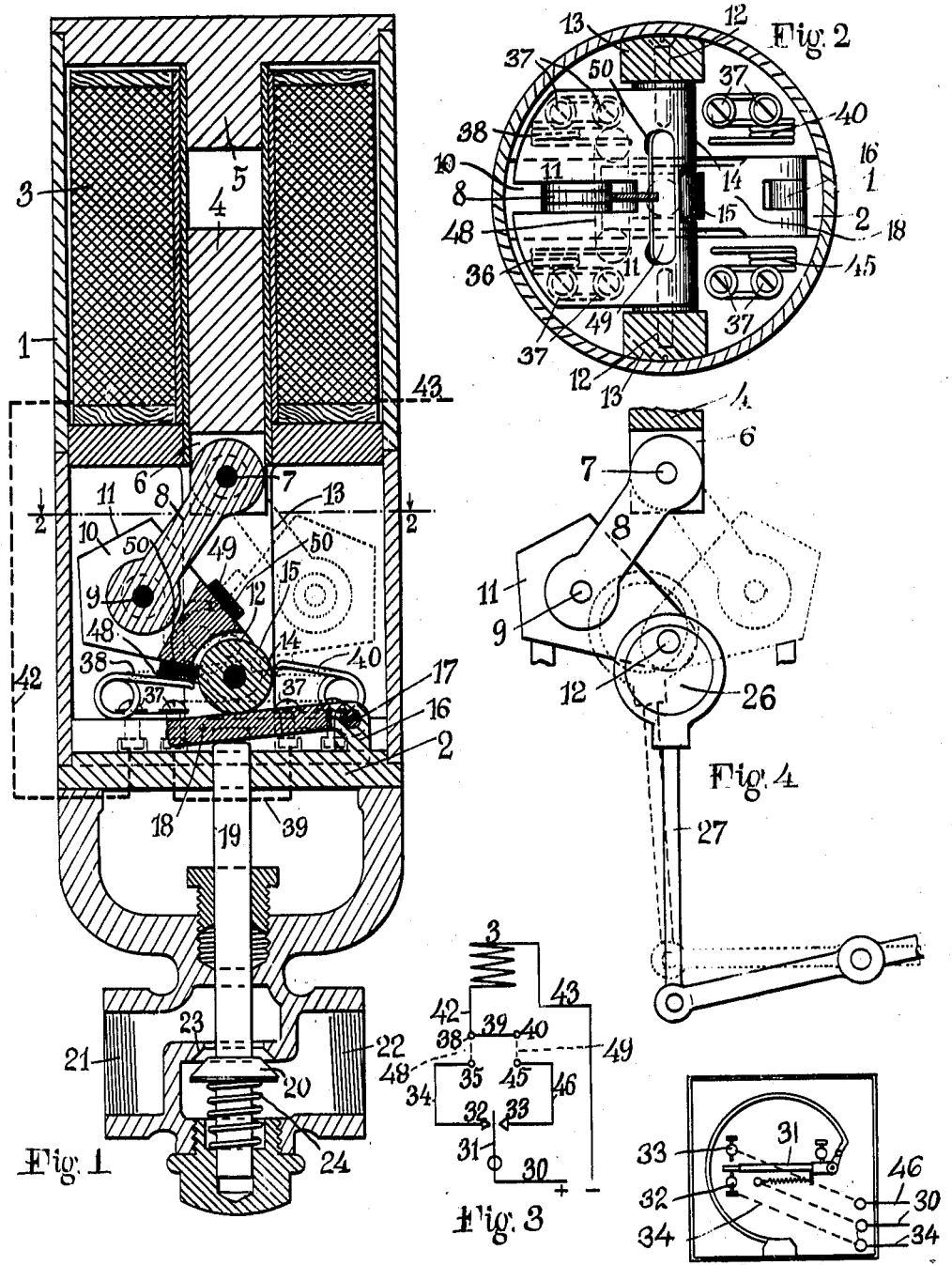

DAVID H. DARRIN, OF NEW YORK, N. Y., ASSIGNOR TO AUTOMATIC SWITCH COMPANY, A CORPORATION OF NEW YORK.

REGULATING APPARATUS.

1,050,431.   Specification of Letters Patent.   Patented Jan. 14, 1913.

Application filed February 7, 1908, Serial No. 414,673. Renewed October 7, 1912. Serial No. 724,437.

*To all whom it may concern:*

Be it known that I, DAVID H. DARRIN, a citizen of the United States, residing at New York, in the county of New York and State of New York, have invented certain new and useful Improvements in Regulating Apparatus, of which the following is a full, clear, and exact specification.

This invention relates to regulating apparatus adapted for controlling a valve, damper or the like, and has especial reference to a thermostatic or pressure-controlled apparatus in combination with a magnet and a valve or damper mechanism, for maintaining a predetermined temperature of a room, or of some apparatus such as a sterilizer, a cooling cylinder, or the like.

The invention is shown herein comprising a valve mechanism such as would be used for a radiator or other fluid controlling system where the flow is to be controlled according to temperature, though, as will hereinafter appear, the apparatus can be controlled by pressure, or manually.

For operating a valve, damper or the like, the mechanisms heretofore devised require current to hold the part in one or the other position, which position in some instances must be maintained for a considerable length of time. Alternating current is not available for such purpose without considerable complexity of mechanism, by reason of the tendency of alternating current magnets to chatter, and also by reason of the heating of the magnet coils caused by self-induction. According to this invention, an apparatus is provided wherein the valve stem or other part is indirectly connected to be actuated from the core by momentum of the moving parts, which, when at rest, set the magnet circuit so that it can be completed by the thermostat or whatever regulating device is used in the external circuit, to move the valve or damper in the opposite direction from which it was last moved upon lifting the core. By such means, current is not required to hold the valve or other device in either position, but only to energize the magnet to move the part.

In the specific embodiment of the invention, the core and a momentum device connected therewith, are lifted to a definite height by the energization of the magnet, and their momentum utilized,—the magnet having been deënergized during the rising movement,—to supply the mechanical force for operating the valve, damper or other part. By this means the entire strength of the magnet is available for supplying actuating power, during the movement of the core in rising or falling instead of using a part of the energy of the magnet or of the moving parts to reset the mechanism for the next actuation. When the magnet is deënergized, the core falls, ready to be again lifted for the next actuation.

The invention will be more fully understood in connection with the description of the accompanying drawing, wherein—

Figure 1 is a vertical section of a valve mechanism embodying the invention; Fig. 2 is a cross section on the line 2—2 of Fig. 1; Fig. 3 is a wiring diagram wherein a thermostat is used as the regulating means; Fig. 4 is a detail view of a modification; and Fig. 5 shows a pressure regulator controlling mechanism.

1 represents a casing or frame having a base 2 and containing a solenoid winding 3. 4 is the core of the solenoid which is movable vertically toward and from the stationary portion of the core 5. The lower portion of the core 4 is slotted as at 6, and pivoted thereto on the pin 7 is a link 8. The other end of the link 8 is pivoted at 9 in the slot 10 of a weight 11, which weight is itself pivoted on screws 12 carried in lugs 13 on the casing 1. The weight 11 is extended below the pivot 12 forming a short arm 14 which is slotted and carries a roller 15, which latter may be the actuating member for the valve stem, damper lever, or whatever other device is to be controlled, a damper being considered a form of valve. As herein shown, the base 2 carries lug 16 in which is pivoted at 17 a lever 18 on which the roller 15 travels, and the lever 18 bears on the end of a reciprocatory valve stem 19.

20 represents a valve carried by stem 19 and controlling the passage of a fluid such as steam, water, air or the like, between the passages 21, 22, the valve seating at 23.

24 is a spring normally tending to hold the valve 20 seated, and also tending normally to lift the lever 18 to a more horizontal position than that shown. In the position shown, the weight 11 is on the left side, and the roller 15 is substantially under the centers 12 about which the weight 11 swings, so that the lever 18 and consequently the valve stem 19, are pushed downward and held by the weight 11 against the tension of spring 24, thus holding the valve open as long as the parts stay in this position. When the weight 11 is on the right side, the roller 15 is moved out of engagement with the lever 18, thereby permitting the spring 24 to raise the valve stem and close the valve, and the parts will remain in this position as long as the weight remains on the right side of its center. It will thus be seen that the left and right positions of the weight correspond respectively to the open and closed positions of the valve, that is to say, a definite position of the weight corresponding to a definite position of the valve. It will of course be obvious that the action might be reversed so that the spring would tend to open the valve, and the weight to close it, without departing from the scope of the invention. It will also be understood that the mass of the weight 11 and the strength of the spring 24, will be proportioned with respect to each other so that the weight in coming to its position of rest on one side or the other of the center will operate the valve against the pressure of the spring. Where heavy pressures are to be controlled, it may be necessary to modify the particular type of valve herein illustrated, as by using a balanced valve, and also the valve stem could be directly connected with the weight 11 and still carry out the invention, so long as one position of the weight held the valve closed and the other position opened it similarly to Fig. 4. In Fig. 4, an eccentric 26 is fixed to the weight 11 and forms the short arm of said weight, and rod 27 has its sleeve slidably secured to said eccentric 26, and this is directly connected to the weight 11 and moved thereby positively in both directions by the combined influence of the magnet and the momentum of the weight.

The electrical circuits for energizing the magnet will vary according to the use to which the invention is to be put, and may be either automatic and actuated according to temperature variations, as by a thermostat, or could be manual. An example of the former use is herein illustrated, wherein a thermostat is used for controlling the energization of the magnet, and thereby opening or closing the valve according to temperature variations.

The electrical circuits and contacts will now be considered. 30 represents a line wire for incoming current leading to a thermostatic bar 31, which vibrates between two contacts 32, 33. From contact 32 a wire 34 leads to a binding post 35 on the base 2, and secured to this binding post and connected therewith is a contact spring 36, this spring being fastened by screws 37. At the other side of the base is a similar contact spring 38, mounted in a similar manner and connected by a wire 39 with a contact spring 40. From the contact spring 38 a wire 42 passes through the magnet coils 3 and thence out by a wire 43 to the negative side of the line. On the same side of the base is a contact spring 45, which latter is connected with contact point 33 by wire 46.

The weight 11 is provided with two bridge plates 48, 49 mounted on its opposite sides and insulated therefrom by fiber insulation 50. In the position shown in Fig. 1, the contact springs 36, 38 are bridged by plate 48, so that the magnet coil 3 can be energized from wire 30 through thermostatic bar 31, contact 32, wire 34, contact spring 35, bridge 48, contact spring 38, wire 42, and thence out by wire 43 to the negative side of the line. When this circuit is closed, the core 4 will be drawn up suddenly, whereby the weight 11 will be thrown from the position shown in the drawings on the left side over to the right side. In this movement, the bridge plate 48 will open the circuit at springs 36, 38 as soon as it moves out of contact, and the remainder of the movement of the weight will be due to its own momentum, acquired before the magnet circuit opened.

It might be here stated that the contact springs 36, 38 and 40, 45 are all proportioned so as to yield somewhat to the weight, the core and the link, this being for the purpose of remaining in contact with the bridge plates 48 or 49 for a sufficient length of time to enable the magnet to be fully energized. As the weight 11 throws over, the roller 15 moves out of contact with the lever 18, thus permitting the spring 24 to close the valve 20, and shut off the flow of fluid. When the weight 11 comes to rest on the right side, the contact springs 40, 45 are bridged by the plate 49, and the magnet circuit is now set from contact 33 through wire 46, contact spring 45, bridge plate 49, contact spring 40, wire 39 and wire 42 to magnet coil 3 and out by wire 43 as before, it being observed that the current passes in the same direction through the magnet in either position of the weight. As the thermostat 31 cools off, it will move away from contact 32 and eventually close the circuit at contact 33, and energize the coil to throw the weight back from the right side to its original position, and opening the valve by reason of the cam action of the roller 15 on the valve stem 19 through the lever 18, and again setting the magnet circuit by contact springs 36 and 38 and bridge plate 48. Instead of using the thermostat as 30, operated by heat variations, well known forms of pressure regulators operating by variations in pressure, such as a diaphragm, or a Bourdon tube as in Fig. 5, may be used, and a valve, damper or the like controlled in the same manner.

From the foregoing description, it will be seen that the invention is capable of application for regulating and controlling many forms of apparatus employing dampers, valves or the like. A further important advantage of the invention is that this apparatus can be used on either alternating or direct current, and with alternating current the invention has particular advantages. The difficulties in using alternating current for energizing magnets are principally due to the self-induction and heating caused when the core is drawn into the solenoid, which heating frequently becomes so great as to burn out the coils and destroy the magnet. Where it is necessary to keep a magnet energized to hold a part in one or another position, complex magnets have been necessary, in order to prevent chattering and overheating, but in this device such difficulties are avoided inasmuch as the current is only on long enough to give the weight the necessary momentum to actuate the device, whereupon the current is cut off. Under such circumstances, the magnet can take a very large current without danger of burning out so that by proportioning the mass of the weight and the strength of the magnet, devices requiring considerable power can be operated by the momentum of the weight, under conditions where it would be impracticable to operate them directly by the magnet itself.

It will furthermore be observed that the magnet circuit is set when the core is down, and that the magnet lifts the core and breaks its own circuit. The lifting of the core sets the weight in motion, so that the core and weight fall together when the circuit is cut off and supply, in falling, power for actuating the valve, damper or other part. The magnet thus need be only of sufficient strength to lift the core and weight, and the energy thus imparted will all be available during the fall for actuating power, and no power will be needed for resetting any parts or springs for the next actuation, beyond that required for moving the valve or part to be actuated.

The mechanism herein shown is capable of various modifications and changes without departing from the scope of the invention, which is not to be restricted to the precise construction herein described.

Having thus described my invention, I declare that what I claim as new and desire to secure by Letters Patent, is:—

1. The combination with a magnet, of a vertically movable core, a weight connected to said core, means for movably supporting said core and said weight whereby upon energization of said magnet said core is lifted and said weight is moved from one position of rest and upon deënergization of said magnet said core returns to its original position and said weight is dropped to a different position of rest, a valve controlled by the position of said weight, and means for closing and opening the circuit of said magnet.

2. The combination with a magnet and means for energizing the same, of a core adapted to be lifted when the magnet is energized, a weight connected to be lifted by the core, means for automatically cutting off the current to permit the core and weight to fall, a valve adapted to be moved in either of two predetermined directions and to be operated in one of said directions by the momentum of said core, and means for moving said valve in the other of said directions.

3. The combination with a magnet, and means for energizing it, of a core adapted to be lifted when the magnet is energized, a weight connected to be lifted by the core and having a plurality of positions of rest, means for automatically cutting off the current to permit the core and weight to fall, a valve adapted to be controlled by the position of said weight, and means whereby the circuit is set when the core is at rest, for another actuation.

4. The combination with a magnet, and means for energizing it, of a core adapted to be lifted when the magnet is energized, a weight connected to be lifted and moved alternately from one position of rest to another position of rest by successive actuations of said core, means for automatically cutting off the current to permit the core and weight to complete their movement by momentum, and a valve having its position controlled according to the position of said weight.

5. The combination with a magnet and means for energizing the same, of a core, a weight having two positions of rest, means for movably supporting said core and said weight, whereby upon energization of said magnet said weight is moved by said core from one of said positions of rest and upon deënergization of said magnet said core is returned to its original position and said weight is moved to the other of said positions of rest, a fluid controlling device varying in position with the position of said weight and adapted to be actuated from one of its positions by the momentum of said core and weight, and means for actuating said controlling device from its latter named position to its former named position.

6. The combination with a weight pivoted to swing from one side to the other about a pivot, of a fluid controlling device varying in position according to the position of the weight, and actuated in one direction by the momentum of the weight, means for lifting the weight to impart momentum thereto, and means for cutting off the power to permit the weight to fall by its momentum to the other side and the core vertically to a position to again actuate the weight.

7. The combination with a valve having a plurality of positions, of a magnet and core for controlling the movement of said valve from one position to the other, connections between said valve and core comprising a weight and a lever whereby upward movements of the core move the valve alternately in one of two predetermined directions, and a plurality of contacts controlling the magnet circuit, one or the other of which is closed according to the position of the valve as determined by the position of the weight.

8. The combination with an electromagnet, of a vertically movable core mounted to be lifted when the electromagnet is energized, a weight connected to said core and pivoted out of alinement with its center of gravity, said weight and said core being adapted upon energization of said electromagnet to be lifted from one position of rest to another position of rest, a valve operated by the momentum of said weight and said core, and means automatically operated by said weight for interrupting the circuit of said electromagnet.

In testimony whereof I affix my signature in presence of two witnesses.

DAVID H. DARRIN.

Witnesses:
JULIAN S. WOOSTER,
GEO. A. HOFFMAN.